United States Patent Office 3,533,984
Patented Oct. 13, 1970

3,533,984
PROCESS FOR PRODUCING POLYAMIDE CONTAINING PIGMENT
Masashi Yamamoto, Uji-shi, Kyoto-fu, Akira Hanawa, Muko-machi, Kyoto-fu, Hiroyuki Uejima, Nara-ken, and Toshimi Shibata, Uji-shi, Kyoto-fu, Japan, assignors to Nippon Rayon Co., Ltd., Kyoto-fu, Japan, a corporation of Japan
No Drawing. Filed May 24, 1966, Ser. No. 552,445
Claims priority, application Japan, May 28, 1965, 40/31,427; May 29, 1965, 40/31,506
Int. Cl. C08g 20/12; C08k 1/06
U.S. Cl. 260—37        4 Claims

ABSTRACT OF THE DISCLOSURE

The present invention is a process for producing delustered or mass-colored polyamide containing uniformly dispersed pigment by dispersing a pigment in a polyamide producing raw material by using a phosphoric acid ester-type or phosphoric acid salt-type surface active agent as a dispersing agent and then polymerizing the material.

---

This invention relates to processes for producing delustered or mass-colored polyamides containing pigments.

As a process for producing delustered or mass-colored polyamides containing pigments, a process wherein a pigment is dispersed in a polyamide producing raw material and then the material is polymerized or a process wherein a pigment is added to an intermediate polymer during the polymerization or to a polymer after the polymerization is completed is adopted. Of them, the process wherein a pigment is added to an intermediate polymer requires a special apparatus for it and has various difficulties in the control of steps and the process wherein a pigment is added to a completed polymer has a great difficulty in well dispersing the pigment. Therefore, the process wherein a pigment is added to a polyamide producing raw material and then the material is polymerized is most advantageous.

However, the problem in this process is how the pigment can be uniformly dispersed. Unless the dispersion is good, in the case of producing shaped articles from the polymer, there will be caused many troubles. For example, when producing fibers from it, there will be caused nozzle clogging, thread cutting or napping troubles in the spinning and drawing steps.

There have been already known various dispersing methods but none of them is satisfactory enough and it is difficult to apply any of them specifically to the VK type continuous polymerizing process or the like. For example, there is a known process wherein a pigment is dispersed in a polyamide producing raw material by using as a dispersing agent such nonion surface active agent as for example, polyoxyethylene oleyl ether and then the material is polymerized. However, such dispersing agent is not so high in the heat resistance that it will decompose during the polymerizing reaction and will have a bad influence on the polymer to be obtained. Further, its property of dispersing the pigment is not sufficient.

As a result of making various researches to eliminate these defects, we have discovered that a polyamide in which a pigment is uniformly dispersed can be produced by dispersing the pigment in a polyamide producing raw material by using a phosphoric acid ester type or phosphoric acid salt type surface active agent as a dispersing agent and then polymerizing the material.

The phosphoric acid ester type surface active agent is preferably a phosphoric acid ester of an additive of an aliphatic alcohol, fatty acid or alkyl phenol having carbon atoms of 10 to 22 and 5 to 40 mols of ethylene oxide and/or propylene oxide or its salt of a metal in Groups I to IV in the Periodic Table. Its concrete compounds are exemplified to be polyoxymethylene lauryl ether phosphate, polyoxyethylene cetyl ether phosphate, polyoxyethylene oleyl ether phosphate, polyoxyethylene stearyl ether phosphate, polyoxyethylene oxypropylene lauryl ether phosphate and polyoxyethylene oxypropylene stearyl ether phosphate. The ether part of each of the above compounds may be ester and polyoxyethylene dodecyl phenyl ether phosphate and their potassium, sodium, calcium, zinc, boron, aluminum, magnesium, tin and lead salts.

Further, the phosphoric acid salt type surface active agent is preferably a salt of a tertiary alkyl amine in which, of three alkyl radicals, each of two has 8 to 22 carbon atoms and one has 1 to 5 carbon atoms and phosphoric acid or a phosphate of a metal in Groups I to III in the Periodic Table. Its concrete compounds are exemplified to be phosphoric acid salts, potassium phosphate salts, sodium phosphate salts, calcium phosphate salts, zinc phosphate salts, boron phosphate salts, aluminum phosphate salts and magnesium phosphate salts of distearyl methyl amine, dioleyl methyl amine, dicetyl methyl amine; dilauryl methyl amine and dioctyl methyl amine. (The methyl radical in each of the above compounds may be replaced with ethyl radical.)

Each of these compounds is not only excellent as a dispersing agent but also has an action of inhibiting such reactions as the decomposition and coloring of the polymer by oxygen present in the polymerizing reaction and an effect of giving an antistatic property, resistance to heat and oxygen to the obtained polymer.

The pigments that can be used in the present invention include all of such inorganic and organic pigments stable at the polymerizing reaction temperature of polyamide as titanium dioxide of the anatase type and rutile type), carbon black, cadmium yellow, zinc oxide, iron oxide, phthalocyanine series dyes and anthraquinone series dyes.

In working the present invention, preferably in an inert gas atmosphere, any of the above mentioned dispersing agents in an amount of 0.1 to 25%, preferably 2 to 10%, to the weight of the pigment is dissolved in a polyamide producing raw material, the pigment is then added to the solution and the mixture is stirred at such high speed as, for example, more than 2000 r.p.m. so that the pigment may be completely dispersed and is then subjected to a polymerizing reaction by any normal process. When a pigment dispersion of a low concentration is to be prepared, a dispersion of a high concentration may be first prepared and may be added to the polyamide producing raw material so that the pigment concentration may be as required.

The dispersion obtained by the present process will not be subjected to the action of such various additives at the time of the polymerization as, for example, water and organic acids and its state of dispersion will little vary even during the polymerizing reaction.

The present invention can be applied to such various polyamides as nylon 6 and nylon 66. Specifically, in case it is applied to nylon 6, its effect will be high.

The present invention shall now be explained concretely with reference to examples. In the examples, the degree of dispersion of the pigment represents in percent the ratio of the pigment content as measured after the material was left for a fixed time or after the polymerization to the pigment content just after the dispersion.

EXAMPLE 1

100 g. of ε-caprolactam was melted at 100° C., 4 g. of potassium salt of polyoxyethylene lauryl ether phosphate was dissolved therein, 50 g. of anatase type titanium dioxide was then added thereto under stirring and the mixture was stirred at 3,000 r.p.m. for 30 minutes and was then left at 80° C. for 24 hours. (The degree of dispersion of the pigment then was 98.9%.) 3 g. of the thus obtained dispersion was added to 100 g. of ε-caprolactam melted previously, water in an amount of 0.3% to the weight of ε-caprolactam was added thereto and the mixture was stirred at 500 r.p.m. for 15 minutes, was then enclosed in a reaction tube in a nitrogen gas current and was polymerized at 255° C. for 24 hours. The degree of dispersion of the pigment in the obtained polymer was 99.7%. As a result of the observation under an optical microscope, the state of dispersion was found to be very good.

EXAMPLE 2

The process of Example 1 was repeated by using sodium salt of polyoxyethylene stearyl ether phosphate as a dispersing agent. The degree of dispersion of the pigment in the polymer was 99.1%.

EXAMPLE 3

The process of Example 1 was repeated by using rutile type titanium dioxide as a pigment. In such case, the degree of dispersion of the pigment after the mixture was left for 24 hours was 99.2% and that in the polymer was 99.7%.

EXAMPLE 4

The process of Example 1 was repeated by using sodium phosphate salt of distearyl methyl amine as a dispersing agent. The degree of dispersion of the pigment after the mixture was left for 24 hours was 99.3% and that in the polymer was 99.8%.

What is claimed is:

1. A process for producing poly-caprolactam containing titanium dioxide comprising dispersing titanium dioxide in molten ε-caprolactam by using a surface active agent as a dispersing agent in an amount of 0.1 to 25% by weight of titanium dioxide, and then polymerizing the material, said surface active agent being either a K or Na salt of a phosphoric acid ester of a reaction product of an aliphatic alcohol, fatty acid or alkyl phenol each having carbon atoms of 10 to 22 and 5 to 40 molecules total of ethylene oxide and/or propylene oxide, or a quaternary salt of a tertiary alkyl amine in which of three alkyl radicals, two have 8 to 22 carbon atoms and one has 1 to 5 carbon atoms and an acidic phosphate of K or Na.

2. The process according to claim 1, wherein a K or Na salt of a polyoxyethylene lauryl ether phosphate is used as a dispersing agent.

3. The process according to claim 1, wherein a K or Na salt of a polyoxyethylene stearyl ether phosphate is used as a dispersing agent.

4. The process according to claim 1, wherein a salt of distearyl methyl amine and an acidic phosphate of K or Na is used as a dispersing agent.

References Cited

UNITED STATES PATENTS

| 3,004,056 | 10/1961 | Nunn | 260—950 |
| 3,380,927 | 4/1968 | Edelstein | 260—950 |
| 2,586,897 | 2/1952 | Koodstock | 252—135 |
| 3,308,161 | 3/1967 | Shen | 252—357 |
| 2,925,397 | 2/1960 | Hopfner. | |
| 2,846,332 | 8/1958 | Nesty. | |
| 3,279,974 | 10/1966 | Twilley. | |
| 2,868,757 | 1/1959 | Symons. | |
| 2,341,759 | 2/1944 | Catlin. | |
| 2,884,410 | 3/1959 | Randall. | |

FOREIGN PATENTS

| 910,642 | 11/1962 | Great Britain. |
| 767,897 | 2/1957 | Great Britain. |
| 835,920 | 5/1960 | Great Britain. |

OTHER REFERENCES

Schwartz and Perry: "Surface Active Agents," vol. II, Interscience Pub. Inc., New York, pp. 132 and 738.

MORRIS LIEBMAN, Primary Examiner

P. R. MICHL, Assistant Examiner

U.S. Cl. X.R.

260—583